(12) United States Patent
Vasnier et al.

(10) Patent No.: US 12,353,468 B2
(45) Date of Patent: Jul. 8, 2025

(54) METHOD AND SYSTEM FOR MERGING INFORMATION

(71) Applicant: AIRBUS DEFENCE AND SPACE SAS, Toulouse (FR)

(72) Inventors: Kilian Vasnier, Elancourt (FR); Sylvain Gatepaille, Elancourt (FR); Valérian Justine, Elancourt (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 20 days.

(21) Appl. No.: 17/619,087

(22) PCT Filed: Jun. 12, 2020

(86) PCT No.: PCT/EP2020/066282
§ 371 (c)(1),
(2) Date: Feb. 23, 2022

(87) PCT Pub. No.: WO2020/249719
PCT Pub. Date: Dec. 17, 2020

(65) Prior Publication Data
US 2022/0374464 A1 Nov. 24, 2022

(30) Foreign Application Priority Data
Jun. 14, 2019 (FR) ...................................... 1906376

(51) Int. Cl.
*G06F 16/00* (2019.01)
*G06F 7/14* (2006.01)
*G06F 16/36* (2019.01)

(52) U.S. Cl.
CPC .............. *G06F 16/367* (2019.01); *G06F 7/14* (2013.01)

(58) Field of Classification Search
CPC .................................. G06F 16/367; G06F 7/14
See application file for complete search history.

(56) References Cited

U.S. PATENT DOCUMENTS 9,734,146 B1 * 8/2017 McNair ................. G06F 16/367
10,302,769 B2 * 5/2019 Delay ..................... G06F 17/00
(Continued)

OTHER PUBLICATIONS

Anne-Laure Jousselme et al. "Characterization of Hard and Soft Sources of Information: A Practical Illustration". 17th International Conference on Information Fusion, Oct. 2014.
(Continued)

*Primary Examiner* — Dinku W Gebresenbet
(74) *Attorney, Agent, or Firm* — Williams Mullen; R. Brian Drozd

(57) ABSTRACT

The method and system for merging information aimed at merging the instances of individuals, a data-processing system performs the following steps: generating the instances of individuals using an ontology which defines, for each property of each instance of an individual, an evolution model to be applied to the property, evolution model representing the evolution of reliability of the property over time in relation to variability of the property over time; preforming the merging of information by comparing, two-by-two, the generated instances of individuals with instances of individuals stored in a knowledge base, performing, for each shared property, a calculation of similarity distance by applying at least evolution model defined for the property, so as to define a coefficient of confidence for each property in order to decide whether or not to merge the instances of individuals; and updating the knowledge base with the instances of individuals resulting from information merging.

11 Claims, 4 Drawing Sheets

(56) References Cited

U.S. PATENT DOCUMENTS

| | | | | |
|---|---|---|---|---|
| 2008/0208801 | A1* | 8/2008 | Friedlander | G06F 16/907 |
| 2010/0023482 | A1* | 1/2010 | Mershon | G06F 16/9535 |
| | | | | 707/E17.014 |
| 2010/0121885 | A1* | 5/2010 | Hosomi | G06F 16/367 |
| | | | | 707/794 |
| 2010/0306141 | A1* | 12/2010 | Chidlovskii | G06N 20/00 |
| | | | | 706/13 |
| 2011/0270875 | A1* | 11/2011 | Mershon | G06F 16/748 |
| | | | | 707/769 |
| 2012/0078595 | A1* | 3/2012 | Balandin | G06F 16/367 |
| | | | | 703/6 |
| 2015/0286713 | A1* | 10/2015 | Zhang | G06F 16/367 |
| | | | | 707/749 |
| 2016/0179945 | A1* | 6/2016 | Lastra Diaz | G06F 16/284 |
| | | | | 707/739 |
| 2017/0083547 | A1* | 3/2017 | Tonkin | G06F 16/23 |
| 2017/0103131 | A1* | 4/2017 | Martin | G06F 16/2365 |
| 2018/0203125 | A1* | 7/2018 | Delay | G01S 5/0027 |
| 2019/0318269 | A1* | 10/2019 | Ezen Can | G06N 20/00 |

OTHER PUBLICATIONS

Amanda Vizedom et al. "Knowledge Base Support for Decision Making Using Fusion Techniques in a C2 Environment". Proceedings of the 4th International Conference on Information Fusion, International Society of Information Fusion, 2001.

A.C. van den Broek et al. "Improving Maritime Situational Awareness By Fusing Sensor Information and Intelligence". International Conference on Information Fusion, 2011.

Zhibiao Wu et al. "Verb Semantics and Lexical Selection". Proceedings of the 32nd Annual Meetings of the Associations for Computational Linguistics, 1994, pp. 133-138.

Amandine Bellenger. "Semantic Decision Support for Information Fusion Applications". PhD Thesis, Institut National des Sciences Appliquées de Rouen, 2013.

Sep. 8, 2020 International Search Report issued in International Patent Application No. PCT/EP2020/066282.

Sep. 8, 2020 Written Opinion issued in International Patent Application No. PCT/EP2020/066282.

Ketan Date et al. "Data Association and Graph Analytical Processing of Hard and Soft Intelligence Data". Proceedings of the 16th International Conference on Information Fusion, ISIF (International Society of Information Fusion), Jul. 9, 2013, pp. 404-411.

Dafni Stampouli et al. "Situation Assessment for a Centralised Intelligence Fusion Framework for Emergency Services". Information Fusion, 2009, 12th International Conference on Fusion, IEEE, Piscataway, NJ, USA, Jul. 6, 2009, pp. 179-186.

\* cited by examiner

METHOD AND SYSTEM FOR MERGING INFORMATION

TECHNICAL FIELD

The technical field of the present invention relates to the methods and systems for the fusion of information. The technical field of the present invention is also that of the situation awareness methods and systems which are used to detect abnormal behaviors of individuals (vehicle, person, etc.) and which are based on such information fusion methods and systems.

PRIOR ART

Many areas and activities have an interest in the fusion of information: medical, environment, air and sea traffic monitoring, military security, etc. Their common point lies in the fact of having to manage dynamic systems in real time with a multitude of data which have to be synthesized into a single operational array in order to allow a better understanding of the situation, which is called "situation awareness".

The information to be processed to establish such an operational array can originate from varied sources. Two categories of information supplied can be distinguished: the so-called "hard" information and the so-called "soft" information. The hard information provides a quantitative evaluation of elements and originates from physical sensors (camera, microphone, radar, etc.). The soft information originates from an extraction of linguistic content (observer ratio, text, telephone call, etc.) allowing a qualitative evaluation of elements and of any relationships between them. In other words, hard information is precise information that more often than not can be reduced to a numeric value, and soft information is information that is often difficult to reduce to a numeric value, requiring knowledge of the context in which the information was acquired to understand it and which is difficult to analyze when isolated from the environment in which said information was collected.

The information fusion comprises several steps, of which the two main ones are (1) a calculation of similarity distance between the different information available, although this information is intrinsically varied, and (2) the association of this information, or not, depending on the result of the similarity calculation. The objective here is to identify whether diverse information received relates to a single individual, or not. The term "individual" is understood in the broad sense in the field of the information fusion, namely a separate unit (entity) in an area of interpretation (person, vehicle, object, group, etc.).

The information fusion solutions in the literature perform a strict comparison between the properties of individuals detected in the information received at a given moment, independently of the time difference between when the pieces of information concerned were generated. For example, when a maritime monitoring system tries to compare information relating to a ship observed three days ago to information relating to a ship observed more recently in order to determine whether or not it is the same individual, the identity of the captain is, at that moment, a more reliable piece of information than the respective positions of these ships. The approach used is, consequently, a factor that slows down automation of the information fusion processes, which then need, from an operational point of view, human interventions to ensure that a similarity detected between information effectively amounts to a correlation and not to a simple coincidence without ground truth.

It is then desirable to overcome these drawbacks in the state of the art. In particular, it is desirable to provide a solution which, in the context of information fusion, reduces the number of false positives and increases the number of true negatives. It is more generally desirable to provide an information fusion solution which is more effective. It is notably desirable to provide a solution which, in the context of situation awareness based on information fusion, limits the intervention of a human operator to decide whether the information presented to him or her represents duplicates or whether said information effectively relates to distinct individuals.

SUMMARY OF THE INVENTION

One object of the present invention is to propose a method for processing information which originates from varied sources and that is used to generate instances of individuals by ontology matching, the information processing method comprising information fusion aimed at merging the instances of individuals which correspond to a single individual, the method being implemented by a data processing system, characterized in that the method comprises the following steps: generating the instances of individuals by using an ontology which defines, for each property of each instance of an individual, an evolution model to be applied to said property, the evolution model represents the evolution of the reliability of said property over time in relation to the variability of said property over time; performing the information fusion by comparing, pairwise, instances of individuals generated with instances of individuals stored in a knowledge base, by performing, for each property in common, a calculation of similarity distance by applying at least the evolution model defined for said property, so as to define a coefficient of confidence of each property to decide to merge or not merge said instances of individuals; and updating the knowledge with the instances of individuals resulting from the information fusion. Thus, the information fusion is effective, because it limits the inclusion of properties as a function of their variability over time which separates two observations (instants at which the pieces of information concerned were captured).

According to a particular embodiment, each evolution model is of a type from among the following three possible types: constant, for the properties which do not change over time; predictive, for the properties which can be estimated over a limited time period or with a certain uncertainty which evolves over time; and circumstantial, for the properties whose evolution over time depends on the occurrence of an event. Thus, the properties are associated with evolution models suited to different types of property variability.

According to a particular embodiment, the circumstantial evolution model is an exponential decay model. Thus, with a time factor of exponential decay that is roughly defined, the properties that are subject to sporadic events influencing the variability of said properties are easily taken into account.

According to a particular embodiment, each instance of an individual which results from the fusion of two other instances of an individual retains only one value for each property out of those available in said other instances of an individual and the value retained depends on the evolution model with which said property is associated. Thus, the information fusion is refined.

According to a particular embodiment: in the case of the constant evolution models, the value retained is that which has the best accuracy; in the case of the predictive evolution models, the value retained is the most recent one; and in the case of the circumstantial evolution models, the value retained is that which shows the highest coefficient of confidence according to the following system of equations:

$$\gamma_1 = \lambda_1 \cdot e^{-(t1-t2)/\tau}$$

$$\gamma_2 = \lambda_2$$

in which the index "1" represents the oldest information and the index "2" represents the most recent information, where $\lambda$ is the coefficient representative of a reliability of the source having performed the capture of the information concerned, $\tau$ is a time factor emphasizing exponential decay, and t represents the instant of capture of the information concerned.

According to a particular embodiment, the method further comprises the following step: analyzing the results obtained by the information fusion in a situation awareness system, and detecting abnormal behaviors of the individuals through a set of predefined rules, or through a situation ontology model, and through the instances of individuals resulting from the information fusion. Thus, the intervention of a human operator to decide whether the information presented to him or her represents duplicates or whether said information effectively relates to distinct individuals is limited.

According to a particular embodiment, the calculation of similarity distance by the application at least of the evolution model is aggregated with at least one other similarity calculation. Thus, the information fusion is refined.

According to a particular embodiment, the similarity calculations are weighted. Thus, the information fusion can be easily customized for a specific use case (maritime monitoring, etc.).

According to a particular embodiment, one said other similarly distance calculation is a taxonomic similarity distance calculation and one said domain similarity distance calculation is a range domain similarity distance calculation.

According to a particular embodiment, the similarity distance calculation by application at least of the evolution model applies a coefficient of reliability of the sources having captured the information considered. Thus, more credit can easily be given to information from reliable sources.

According to a particular embodiment, the information to be processed is soft information and/or hard information. Thus, the information fusion is effective regardless of the nature, whether hard or soft, of the information collected.

The invention relates also to a computer program, which can be stored on a medium and/or downloaded from a communication network, in order to be read by a processor. This computer program comprises instructions for implementing the abovementioned method in any one of their embodiments, when said program is run by the processor. The invention relates also to an information storage medium storing such a computer program.

The invention relates also to a system for processing information which originates from varied sources and is used to generate instances of individuals by ontology matching, the information processing system comprising electronic circuitry implementing information fusion aimed at merging the instances of individuals which correspond to a single individual, characterized in that the electronic circuitry implements: means for generating instances of individuals by using an ontology which defines, for each property of each instance of an individual, an evolution model to be applied to said property, the evolution model represents the evolution of the reliability of said property over time in relation to the variability of said property over time; means for performing the information fusion by comparing, pair-wise, instances of individuals generated with instances of individuals stored in a knowledge base, by performing, for each property in common, a calculation of similarity distance by application at least of the evolution model defined for said property, so as to define a coefficient of confidence for each property to decide to merge or not merge said instances of individuals; and means for updating the knowledge base with the instances of individuals resulting from the information fusion.

BRIEF DESCRIPTION OF THE DRAWINGS

The features of the invention mentioned above, and others, will become more clearly apparent on reading the following description of an exemplary embodiment, said description being given in relation to the attached drawings, in which.

DETAILED EXPLANATION OF EMBODIMENTS

Figure 1:
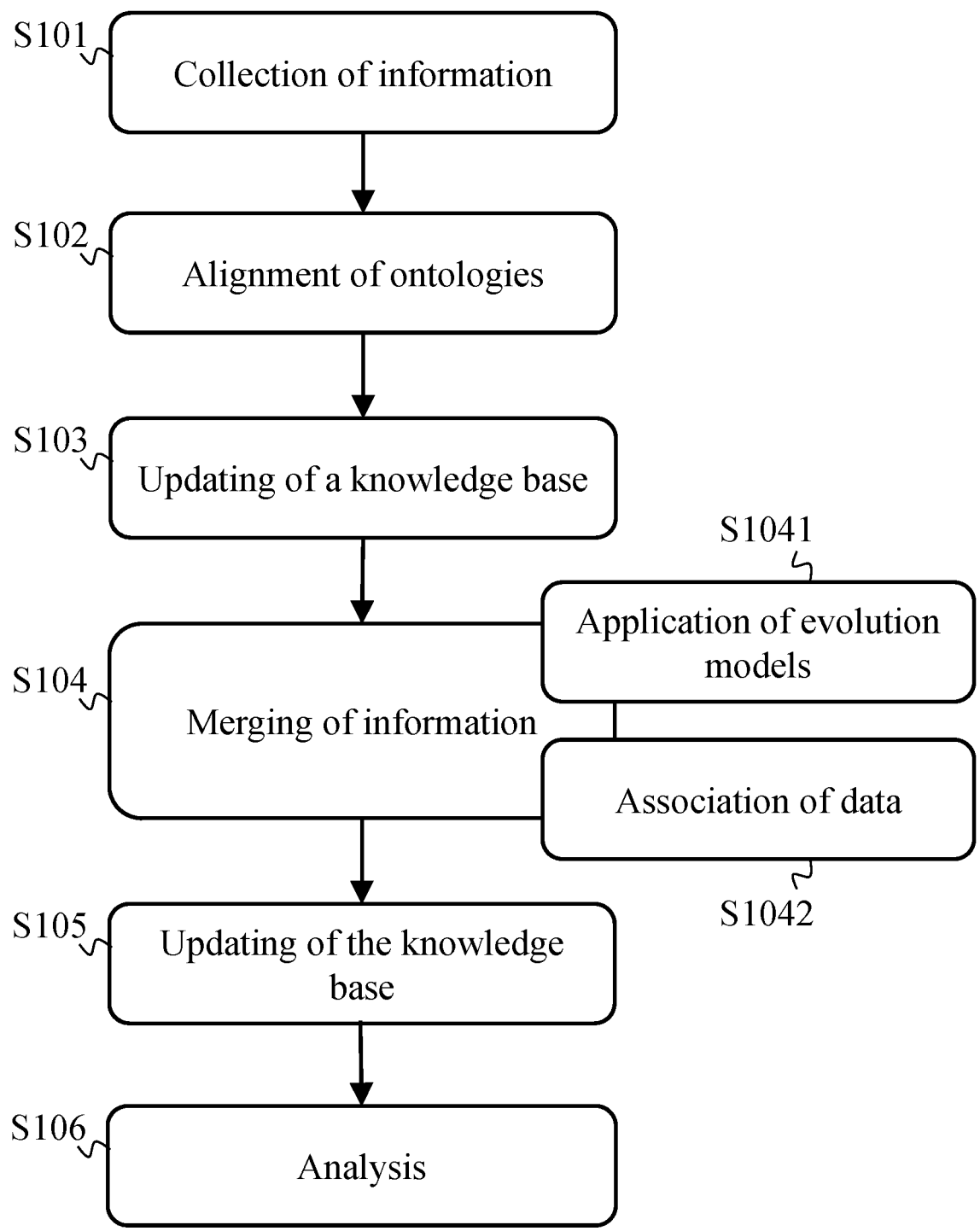
FIG. 1 schematically illustrates an information processing method implementing the present invention.

FIG. 1 schematically illustrates an information processing method implementing the present invention. The method is implemented by an information processing system, an example of hardware arrangement of which is detailed hereinbelow in relation to FIG. 2.

In a step S101, the information processing system performs a collection of information. The collection is multi-source and the information collected comes from sources of varied natures and capacities. Each piece of information collected is either of hard information type, or of soft information type. The multi-source collection consists in collecting information from sources that are pertinent for the use case targeted for the information fusion. Reference can, to this end, notably be made to the document "*Characterization of hard and soft sources of information: A practical illustration*" by Anne-Laure Jousselme et al., 17th International Conference on Information Fusion, 2014.

The hard information is obtained from sources such as physical sensors. This information is then structured, through the nature of the sensors which produce this information, in a raw data format. The soft information is linked to human activity (social media, websites, official reports of a community or an organization, etc.), are generally highly voluminous and unstructured. The extraction of soft information then relies on a linguistic and semantic analysis of the content. Soft information is therefore considered to be subjective, whereas hard information is considered to be objective.

In the case of hard information, the collection is performed directly from physical sensors, or from databases collecting information from these physical sensors, sometimes by applying a processing thereto. In the field of maritime monitoring, reference can notably be made to the databases accessible on the GISIS website (GISIS standing for "Global Integrated Shipping Information System", https://gisis.imo.org) run by the World Maritime Organization, or on the website of the Paris MoU organization ("Paris Memorandum of Understanding on port state control", https://www.parismou.org/) responsible for controlling maritime and port activities in Western Europe, or even to the Interpol databases.

In the case of soft sources, the collection is performed generally from websites or social media, such as Facebook (registered trademark) or Twitter (registered trademark). Platforms providing information of open source origin can also provide information deriving from singular or multiple processing operations (translation, transcription, extraction, etc.) applied to pre-collected information, which makes it possible to derive from it information called individuals of interest (e.g., person, place, organization, event, equipment).

The collected information can thus originate from intelligence of human origin (designated by the term HUMINT, for "Human Intelligence"), from intelligence of open source origin (designated by the term OSINT, for "Open Source Intelligence") from a maritime website, from stream syndication of RSS ("Really Simple Syndication") type, from an automatic identification system AIS for ships, from maritime databases, from radar intelligence (designated by the term RADINT, for "Radar Intelligence") with potentially different types of radar, from intelligence of electromagnetic origin (designated by the term SIGINT, for "Signal Intelligence") such as detections of ship radar activities or from mobile telephony signal analyses, and from intelligence of image origin (designated by the term IMINT, for "Image Intelligence") such as images captured by satellites or drones.

The collection therefore makes it possible to obtain a set of hard and/or soft information relating to individuals. The information relating to these individuals is extracted from the data available from the various sources. The extraction can be done at the source itself, such that the information processing system obtains, in the step S101, information that is already "digested" (e.g., recognition of a form of ship in a sequence of video images). The extraction can, as a variant, be done in the information processing system, which then receives raw data to be digested from the source concerned.

In a step S102, the information processing system performs an ontology matching.

Ontology is a representation of the information of a system which defines the types of individuals of this system with their categories, properties and relationships between these individuals for a specific operational use case (maritime surveillance, for example). Ontology thus makes it possible to have a same representation of information which is compatible both with the hard sources and with the soft sources.

Any individual identified and extracted at the end of the collection of information is instantiated, to make it possible to then feed pertinent information to a situation awareness system. Likewise, any property linked to that individual and extracted from the corresponding collected information is instantiated. It should be noted that a property is either literal (also called "attribute"), such as the length of a ship for example, or a relationship of an individual with another individual, such as the relationship between a ship and its captain for example. However, when the property is not present in the collected information concerned, the property concerned is not instantiated. Thus, an individual extracted from collected information may be totally or partially instantiated.

For example, in the case of maritime surveillance, an ontology can define an individual of "ship" type, with several properties (e.g., name of the ship, owner, observation date, size, position, speed, IMO number ("International Maritime Organization number"). From information originating from a first source (e.g. automatic identification system AIS), an instance (also called object) of an individual representing this ship can be created with a literal instance for the IMO number, the observation date, the position and the speed, but not for the name of the ship, the owner and the size, which do not form part of the information contained in the messages from the automatic identification systems AIS. From another source of information, such as a ship surveillance list for sensitive zones around the world, an instance of an individual representing this ship with a literal instance for the IMO number, the number of the ship and the owner can be created from information deriving from this other source of information, but without literal instance for the speed, the position and the observation date. It should also be noted that, in the field of the information fusion, an instance of an individual that does not comprise an instance of one or more literals in particular may already be a piece of information in itself. Not instantiating a property in an instance of an individual, rather than using a default value for that property, avoids erroneously detecting a correlation between two instances of individuals because of this property which would have been defined by default for one and/or the other of these instances of individuals.

The ontology matching therefore consists of a total or partial instantiation of all the individuals, with their properties and relationships, detected in the collected information, by inheriting definitions supplied by the ontology considered.

The collected information may or may not be already assigned, at the time of collection, to an ontology. The information processing system can also use an existing ontology with the collected information, or use a specific ontology suited to the use case (e.g. maritime surveillance). When the source of information already supplies an ontology, a transcription of the ontology that is supplied by said source of information into an ontology suited to the use case (e.g. maritime surveillance) can be performed. When no ontology is supplied by the source of information, the instantiation of the individuals detected is based directly on the ontology suited to the use case. For the purposes of the invention, the ontology suited to the use case comprises parameters necessary to the setting up of evolution models in association with the instantiating properties.

To apply the appropriate evolution model to each instantiated property, a suitable ontology must be used. That comes from an analysis used to determine which model describes the evolution in time of each defined property and of its variability, and in particular correctly parameterizing the evolution model accordingly (e.g. time factor $\tau$ as presented hereinbelow). The more a property is subject to variations over time, the less a property is considered reliable in the information fusion. Each property is then associated with: a value; an evolution model accompanied by one or more configuration parameters of said evolution model; preferentially, information on reliability of the source of information that made the instantiation of the property concerned possible; and information representative of an instant of observation (i.e. moment when the value of the property was obtained by the source of information). A conventional ontology describes a property only by its value and its instant of observation, and, possibly, by the reliability of the source of information. However, here, each property is complemented by an evolution model which represents the evolution of the reliability of said property over time in relation to the variability of said property over time. "Reliability" is understood to mean the degree of confidence that the information processing system can have in a property value in deciding to merge or not merge instances of individuals, given its variability over the period which separates the instants of capture of the information from which said instances of individuals are extracted.

In a step S103, the information processing system performs an update of a knowledge base KB 205. It should be noted that knowledge bases are distinct from simple databases. An explanation thereof is given in the document "*Knowledge Base Support for Decision Making Using Fusion Techniques in a C2 Environment*", Amanda Vizedom et al., Proceedings of the 4th International Conference on Information Fusion, International Society of Information Fusion, 2001, in which it is stated that the distinction between knowledge bases and databases lies in the distinction between general knowledge and specific data. A knowledge base is optimized to store general knowledge, potentially complex, of the type that can be instantiated. A database, on the other hand, does not generally have means for representing general principles, but is optimized to store highly specific data, such as lists of elements and of attributes. The added value of knowledge bases lies in the fact that they constitute the foundation of reasoning in which new information is deduced from what is already known. That goes beyond the search for data. Reasoning with a knowledge base entails applying and combining general knowledge to draw conclusions that are implicit, but not explicitly contained in the original information. This reasoning based on knowledge allows the diagnosis, surveillance and the general response to queries with a depth that is impossible with a simple database.

The instances of individuals during the ontology matching in the step S102 are therefore stored in the knowledge base KB 205 structured according to the ontology used to describe the individuals instantiated from the various information collected in step S101 (with the parameters needed to put in place evolution models).

In a step S104, the information processing system performs an information fusion operation. The information fusion is based on calculations of similarity distance between instances of individuals, and more particularly of similarity distances between properties of these instances of individuals. The similarity distance between two instances of individuals is a metric defining the extent to which the instantiated individuals are similar or different, or even defining the extent to which it is possible to decide whether these individuals are similar or different.

The information fusion operation performed here takes account of evolution models, associated with each possible property of the individuals according to the ontology applied in the step S102. These evolution models make it possible to take account of the temporal dimension of the properties of the individuals and their respective variabilities in the information fusion operation.

Thus, the step S104 comprises primarily two substeps: a substep S1041 in which calculations of similarity distance are performed by applying the evolution models, for each property of each instance of an individual to be considered; and a data association substep S1042, in which the instances of individuals corresponding to the same individuals are associated, or, depending on the terminology applicable in the area, fused.

There is a certain uncertainty regarding the reliability of the collected information, because of the time period separating the collection of the information related to the variability of the observed properties and, potentially, because of the reliability of the source of information itself (e.g. accuracy of a sensor used to recover this information). Given that in instances of individuals in the knowledge base KB 205 the properties of instances of individuals may have been obtained from different sources of information (because of the information fusion), it is necessary to consider the time dimension of this uncertainty at the level of the properties of the instances of individuals and not at the level of the individuals themselves. Furthermore, each property evolves over time differently. It is then proposed, in the calculations of similarity distance, to associate a weighting for each property of instance of individual. This weighting corresponds to the uncertainty inherent in said property with respect to its method of collection and to an evolution model corresponding to the estimated evolution over time of the variability of said property. The resulting weighting should express the fact that the more uncertain the property is, the less it should have an impact on the calculations of similarity distances, because the information fusion cannot even count on this property to decide whether two instances of individuals considered correspond or do not correspond to a single individual. For example, in the field of maritime surveillance, if the position of a ship observed ten minutes ago is compared to another position of a ship observed 4 days ago, it is not possible to know whether or not these two ships are one and the same ship, because, in 4 days, the possibilities of evolution of the position of a ship are too vast for this to be a reliable comparison criterion. On the other hand, since the length of a ship does not change, comparing an observation of length of a ship one year ago with an observation one day ago is reliable in trying to determine whether or not it is the same ship.

The fact that each property of an individual does not necessarily evolve in the same way as another property of that individual is therefore taken into account here. For example, the length of a ship is not likely to change, unlike its position. Distinct evolution models therefore represent these differences of evolution of the properties over time and therefore represent confidence to be accorded to these properties for the information fusion based on the instants of observation of the property concerned.

Consider an instance of an individual O comprising a set of properties P. For each property $p \in P$, $\gamma_p$ represents a coefficient of confidence defined as follows:

$$\gamma_p = \lambda_p \cdot \mu_p$$

in which $\lambda_p$ is an optional coefficient representative of the reliability of the source of information that made it possible to obtain the instance of the property p considered and $\mu_p$ is the evolution model applicable to the property p considered.

In the case of hard information sources, $\lambda_p$ is preferentially equal to $1-\epsilon_s$, in which $\epsilon_s$ is the error rate of the source of information. In the case of sources of soft information, $\lambda_p$ is preferentially equal to F-measure, also called F-score. The range of $\gamma_p$ is D=[0.1]∈ $\mathbb{R}$, as for $\lambda_p$ and $\mu_p$. A weight (or score) equal to "1" is considered to be a property that is very reliable for performing a calculation of similarity distance and, on the other hand, a zero coefficient of confidence (or weight or score) means the property is too uncertain to be taken into account in the calculation of similarity distance. It should be noted that a transposition into the range D=[−1.1] is possible, in which a coefficient of confidence (or weight or score) equal to "1" designates a property that is highly reliable for performing a calculation of similarity distance, a coefficient of confidence (or weight or score) equal to "−1" should be considered as a property that is too uncertain to be taken into account in the calculation of similarity distance, and a coefficient of confidence (or weight or score) equal to "0" reveals an inability to decide as to the reliability of the property concerned.

The evolution models are preferentially of three possible types: constant; predictive; and circumstantial.

Figure 4A:
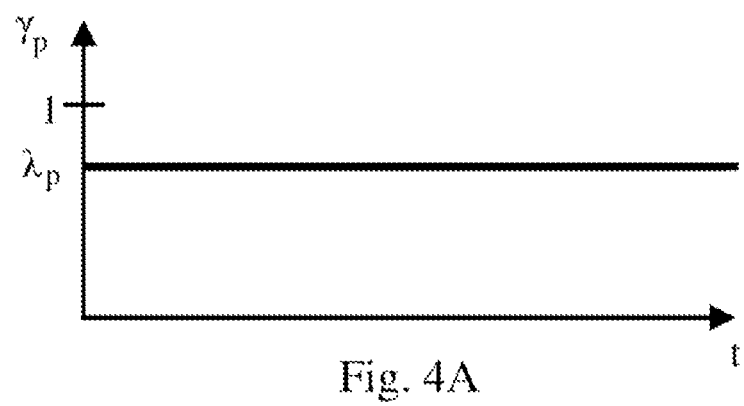
FIG. 4A schematically illustrates a first example of a model of evolution over time of a coefficient of confidence of a property of an instance of an individual.

The constant evolution model is associated with the properties p which do not change over time, such as, for example, the length of a ship. A representation of a particular embodiment is supplied in FIG. 4A, in which it appears that the coefficient of confidence $\gamma_p$ is equal to the coefficient $\lambda_p$ ($\mu_p$ being here equal to "1").

Contrary to the constant evolution model, the predictive evolution model evolves over time and is therefore associated with the properties p which evolve over time. In the case of maritime surveillance, properties p which correspond to the predictive evolution model are, for example, the speed of a ship, its position and its direction of navigation. The values of these properties p can be estimated (i.e. predicted) over a certain time period (over a limited time period, beyond which the variability of the property p considered is such that it has zero reliability) or with a certain uncertainty which evolves over time. For example, knowing the position of a ship and the direction of its movement, it is easy to predict the zone in which the ship will be located in a near future (e.g. a few minutes later). In the case of the predictive evolution models, the evolution is predictable, notably using mathematic tools. Such tools are commonly used, notably to estimate a change of position or of speed of a physical object. Kalman filters or particle filters (also known by the term sequential Monte-Carlo methods) are preferential examples thereof. Through their very nature, the predictive evolution models include a concept of coefficient of confidence, often in the form of a covariance matrix. Thus, in these particular cases, it is the comparison of the properties according to the predictive evolution model which incorporates, directly, not only a predicted value but also the possible error on the prediction. Such is the case for example with the Mahalanobis distance.

The circumstantial evolution model is associated with the properties p whose evolution over time depends on the occurrence of an event. In the literature, such a concept is defined as a rare stochastic event in that this type of event has a more or less reliable probability of occurring. The properties p associated with the circumstantial evolution model are therefore subject to change following an unpredictable specific event. For example, in the case of maritime surveillance, the properties of circumstantial nature are the identity of the captain or the flag of a ship, which can change when the ship concerned changes owner. Another example is the location of the ship, which can change a lot over time. The location here is to be distinguished from the position. The position is a set of geographic coordinates, whereas the location of a ship is the name of the place (e.g. Mediterranean Sea) where the ship is located.

Figure 4B:
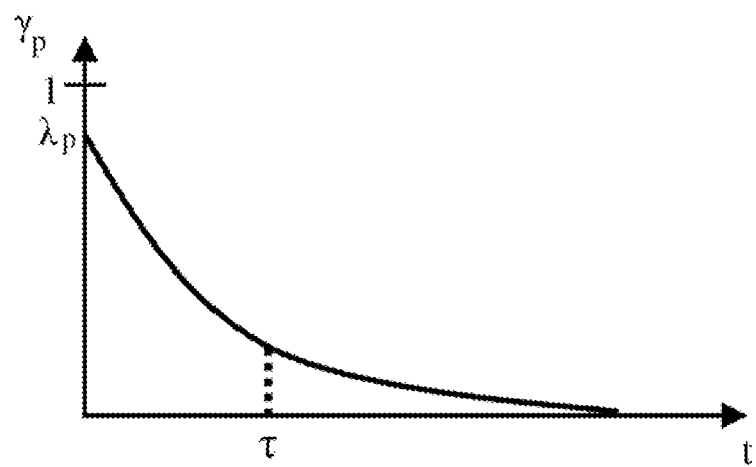
FIG. 4B schematically illustrates a second example of a model of evolution over time of a coefficient of confidence of a property of an instance of an individual.

The difficulty in the circumstantial evolution models is how to define the probability of such an event occurring and find a suitable means of representing it. While the other models could be used, the exponential decaying models appear to be a suitable approach. A representation of an embodiment is provided in FIG. 4B, in which it appears that the coefficient of confidence $\gamma_p$ is defined as follows:

$$\gamma_p = \lambda_p \cdot e^{-t/\tau}$$

in which τ is a time factor that makes it possible to emphasize or not the curve of the exponential decay function. As time passes, the coefficient of confidence $\gamma_p$ decreases gradually. Note that the maximum value of the coefficient of confidence $\gamma_p$ is, here, equal to the coefficient $\lambda_p$, when t=0. The time factor τ can be determined empirically and/or statistically, through specific knowledge. Typically, at 3τ, it is considered that the property has changed, and the coefficient of confidence must then be practically zero. If it is known, through experience, that the captain of a military ship is replaced every 4 years, then: τ=(4 years)/3=16 months. This type of approach, even by roughly defining the time factor τ, significantly improve the information fusion processes.

The similarity distance $DS(I_j, I_k)$ between two instances of individuals $I_j$ and $I_k$ is then an averaged sum of the weighted similarity distances of each property p common to the two instances of individuals $I_j$ and $I_k$ and can then be calculated in the substep S1041 as follows:

$$\forall p \in (I_j \cap I_k), DS(I_j, I_k) = \frac{\sum (dist(p_{I_j}, p_{I_k}) \cdot \gamma_p)}{\sum (\gamma_p)}$$

in which dist $(p_{I_j}, p_{I_k})$ represents the similarity distance, preferentially normalized, of a property p common to the two instances of individuals $I_j$ and $I_k$.

There is a wide range of possible calculations of similarity distances depending on the type of property to be compared. For example, a calculation of similarity distance of a textual property can be obtained through the Levenshtein distance (also called "edit distance"), which is a metric for measuring difference between two sequences of text. In this case, the Levenshtein distance represents the minimum number of character change operations to be performed in order to transform a first word, or a first sequence of words, to correspond to a second word, or, respectively, a second sequence of words. According to another example of calculation of textual similarity distance, the Hamming distance (which is a majorant of the Levenshtein distance) is used. The Hamming distance makes it possible to quantify the differences between two sequences of symbols or characters of the same length.

Other numeric calculations of similarity distances can be used to compare, for example, two speeds or two values of any other physical property.

The aim of the normalization is for the similarity distance calculation results to be able then to be used and compare together despite their heterogeneity and even though they are based on different distance calculations. The aim of the normalization is to make it possible to bound the result of a distance, generally between 0 and 1. Typically, the results of the distance calculations are close to 0 when there is no difference. For example, to normalize the Levenshtein or Hamming distance, the result of the similarity distance calculation simply has to be divided by the sum of the character length of the first sequence and of the length of the second sequence.

For a more accurate overall result, the normalization can be transposed between −1 and 1. The normalization is then done between 0 and 1, then the result of this normalization is subtracted from 1. Thus, 1 represents similarity and −1 represents dissimilarity.

This similarity distance calculation for each property p common to the instances of individuals considered can be aggregated with other similarity distance calculations, as detailed hereinbelow in relation to FIG. 5, in order to obtain an aggregate similarity distance which is then used to decide whether or not to merge the instances of individuals $I_j$ and $I_k$.

In the substep S1042, the information processing system performs a data association operation based on the similarity distances calculated in the substep S1041. The data association is a heuristic that makes it possible to decide whether or not two instances of individuals should be fused, in light of the value (score) of similarity distance between these two instances of individuals. The instances of individuals following the collection of the information and at least a subset of that information already present in the knowledge base KB 205 are analyzed pairwise to determine whether they correspond to a single individual and whether they should consequently be fused. In this regard, reference can be made to the document: "*Systemic Test and Evaluation of a Hard+ Soft Information Fusion Framework—Challenges and Current Approaches*", Geoff Gross et al., 17th International Conference on Information Fusion, 2014.

The information fusion operation of the step S104 therefore consists in, as far as possible, fusion of instances of individuals which represent a single individual. Preferentially, the instance of an individual which results from the fusion of two original individual instances retains only one value for each property out of those available in said original individual instances. The value retained depends on the evolution model with which the property considered is associated.

In the case of the constant evolution models, the value retained is that described by the source (e.g. sensor) of the information from which the instance of an individual considered is extracted which has the best accuracy (which is known because the ontology has the information on the accuracy of the source which observed the property).

In the case of the predictive evolution models, the value retained is the most recent one.

In the case of the circumstantial evolution models, the value retained is that which shows the highest coefficient of confidence according to the following system of equations:

$$\gamma_1 = \lambda_1 \cdot e^{-(t1-t2)/\tau}$$

$$\gamma_2 = \lambda_2$$

in which the index "1" represents the oldest information and the index "2" represents the most recent information, in which λ is the optional coefficient representative of the reliability of the source that performed the capture (or observation) of the information considered, τ is the time factor of the predictive evolution model as previously defined, and t represents the instant of capture (or observation) of the information considered.

In a step S105, the information processing system performs a new update of the knowledge base KB 205. After the information fusion has been performed, each new instance of an individual resulting from the information fusion is stored in the knowledge base KB 205. Given that the similarity distance was sufficiently low to allow the association of data between at least one pair of instances of individuals, the instances of individuals (and therefore their properties) can be fused to generate an "augmented" instance concerning that individual. This new instance can then in turn be associated with one or more other instances in a new iteration of the information fusion operation. The instances of individuals which have allowed the information fusion and the instance of an individual generated by the information fusion are therefore all retained in the knowledge base KB 205 and are linked to one another therein. As a variant, the instances of individuals which were used to create a fused instance of an individual are not retained in the knowledge base KB 205.

In a step S106, a situation awareness system analyzes the results obtained in the information fusion operations performed in the step S105 and represents these results in the form of synthetic views, in order to facilitate the detection of abnormal behaviors. Such situation awareness systems are well known in the field of maritime surveillance and/or emergency preparedness, and are generally operated by regional, national or international organizations responsible for surveilling a given geographic zone. The situation awareness system is incorporated in, or connected to, the information processing system.

Such situation awareness systems implement predefined sets of rules analyzing the results obtained in the step S105 to detect individuals (ship, etc.) with abnormal behaviors with respect to a behavior defined as standard given the type of the individual considered, and if necessary to generate an alert, which is, for example, displayed to the operator. Such rule-based mechanisms are well known in the literature through expert systems. In another example of means implemented by a situation awareness system to detect abnormal behaviors and assess threats, situation ontology models are used to characterize types of behaviors. Such an example of use of situation ontology is described in the document "*Improving Maritime Situational Awareness by Fusing Sensor Information and Intelligence*", van den Broek et al., International Conference on Information Fusion, 2011.

Such situation awareness systems generally comprise one or more common operational views (or "Common Operational Pictures, COP") composed of graphic and/or tabular synthetic views presenting the results of the information fusion with those obtained through other means. For example, the situation awareness system comprises, in a graphical interface, a geographic view of the zone surveilled with a map background or an aerial image or both overlaid. The ships in the surveilled zone are represented overlaid in the geographic view by an icon and a tag giving the ship identification information. A movement vector, or a trajectory, can also be presented for each ship in the geographic view. In this same graphical interface, the situation awareness system can also comprise a tabular or graphic view presenting the alerts generated following the analysis of the results of the information fusion. These alerts can be presented to a human operator according to a color code based on the severity and/or the urgency of the situation, potentially accompanied by a visual and/or audible alert signal.

It is notably accepted in the literature that a human being is capable of correlating up to 7 distinct levels of information so as to obtain operationally usable information. Moreover, the information fusion approaches of the state of the art tend to increase the correlation spaces, but remain limited to properties of individuals for which the time dimension is not counted in the similarity distance calculation. By applying the information fusion techniques of the state of the art to several hundreds of instances of individuals originating from a variety of hard and/or soft information sources representative of only 5 real individuals, the information processing system may only be able to reduce the number of instances of individuals after the information fusion to twenty or so, notably because of the absence of inclusion of the time dimension of the properties. There are therefore still twenty or so instances of individuals reported in the situation awareness and for which the human operator must, him or herself, distinguish whether they are duplicates or distinct individuals. Now, the greater the number of properties of an individual, the more difficult it is for a human operator to reduce the situation awareness to the observation of 5 real individuals and take a safe and rapid decision if necessary.

One of the advantages obtained by the use of the results of the information fusion deriving from the method of the invention in a situation awareness system is therefore to offer a correlation space between information that is much broader than what a human operator is capable of apprehending manually, that is to say solely through his or her cognitive capacities with or without the assistance of the information fusion methods of the state of the art, in order to eliminate the duplicates before display and offer an enhanced and more automated situation awareness. That allows the human operator to concentrate on the interpretation of the situation and on the decision-making, rather than on the residual and manual correlation operations.

In a particular embodiment, the graphical interface also has means for representing the history of the fusions of information performed automatically during the implementation of the method and backed up at the time in the knowledge base KB 205.

It should be noted that the analysis of the results of the information fusion as described in the step S106 is not however limited to the situation awareness examples and to examples of modes of representation previously cited.

Figure 2:
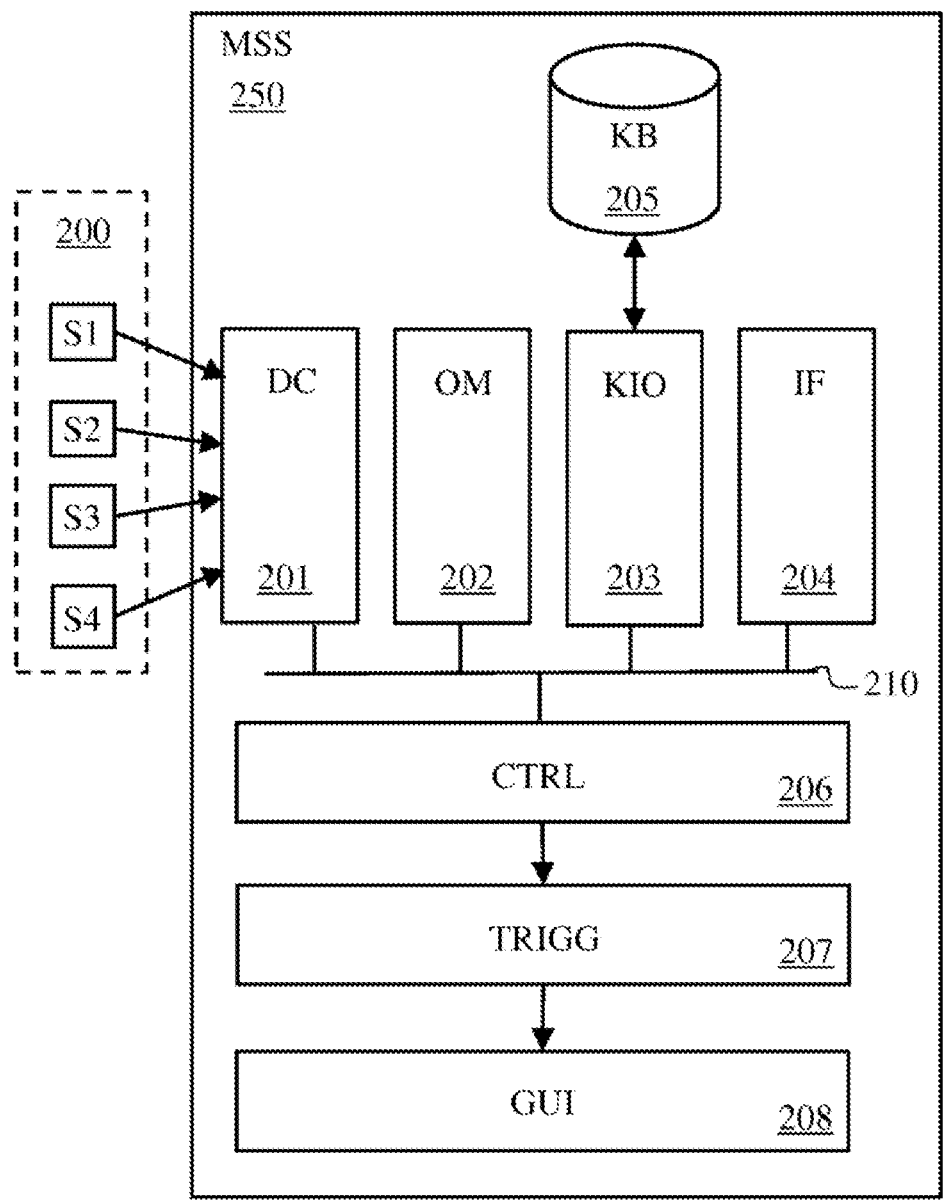
FIG. 2 schematically illustrates an example of hardware arrangement of an information processing system in which the present invention can be implemented.

FIG. 2 schematically illustrates an example of hardware arrangement of an information processing system in which the present invention can be implemented. The information processing system is for example a maritime surveillance system MSS 250. In the maritime surveillance use case, the information collected relates to any ship present at sea in a predefined geographic zone (e.g. all the seas and oceans around the world). Sources have recovered partial or redundant information on the ships. Such information must be correlated to be able to be completed and fused in order to best understand the behavior of all these ships. The result of the information fusion is a descriptive list of ships containing more comprehensive and non-redundant information, which makes it possible to work effectively on the information recovered, which is impossible without precise correlation of the collected information. The evolution models add this precision by taking into account the temporal evolution of the properties of the instances of individuals following the collection of the information and, more particularly, the variability of these properties over time. The units (or modules) presented in the example of an arrangement of FIG. 2 make it possible to achieve this result.

The information processing system comprises a collection unit DC ("Data Collector") 201, responsible for recovering information from a diverse set 200 of sources of information S1, S2, S3, S4, independently of whether the sources concerned provide hard or soft information. The data collector DC 201 behaves as already described in relation to the step S101.

The data collector DC 201 can also include direct access to existing databases containing hard and/or soft information originating from various sources and previously collected through other means. Thus, the information processing system is capable of interconnecting with a distributed database system from distinct actors and authorities.

The information processing system further comprises an ontology matching OM unit 202, which behaves as already described in relation to the step S102.

The information processing system further comprises a knowledge input-output unit KIO responsible for handling input and output access to the knowledge base KB 205. In other words, the input-output unit KIO 203 allows access to the knowledge base KB 205.

The information processing system further comprises an information fusion unit IF 204, which behaves as already described in relation to the step S104.

As already described in relation to the step S106, the information processing system preferentially further comprises a situation awareness system. The situation awareness system then comprises a trigger unit TRIGG 207 and a graphical user interface GUI 208. The trigger unit TRIGG 207 is responsible for raising alerts on the abnormal behaviors detected following the data fusion. The graphical user interface GUI 208 is configured to graphically represent alerts on abnormal behaviors detected following the fusing of information, and individuals related to these alerts.

The information processing system further comprises a control unit CTRL 206 responsible for coordinating, for example using a data bus 310, the various units of the information processing system, so as to implement the behavior already described in relation to FIG. 1.

As described hereinbelow in relation to FIG. 3, each of the collection DC 201, ontology matching OM 202, input-output KIO 203 and information fusion IF 204 units can be produced in hardware form, for example using an electronic component ("chip") or a set of electronic components ("chipset"); or else produced in software form and implemented by a processor executing the corresponding computer program instructions. The same applies for the trigger unit TRIGG 207 and the graphical user interface GUI 208.

Figure 3:
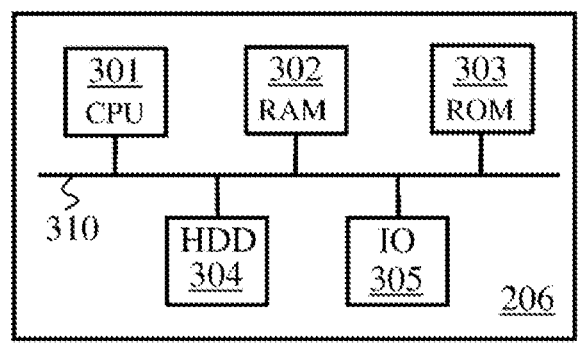
FIG. 3 schematically illustrates an example of hardware arrangement of a control unit used in the information processing system.

FIG. 3 schematically illustrates an example of hardware arrangement of the control unit CTRL 206 of the information processing system.

The example of hardware architecture presented comprises, linked by a communication bus 310: a processor CPU 301; a random access memory RAM 302; a read only memory ROM 303 or a Flash memory; a storage unit or a storage medium reader, such as an SD ("Secure Digital") card reader or a hard disk drive HDD 304; and at least one input-output interface 305.

The processor CPU 301 is capable of executing instructions loaded into the RAM memory 302 from the ROM memory 303, from an external memory (such as an SD card), from a storage medium (such as the hard disk drive HDD), or from a communication network. On power up, the processor CPU 301 is capable of reading instructions from the RAM memory 302 and of executing them. These instructions form a computer program causing the processor CPU 301 to implement all or part of the algorithms and steps described here.

Thus, all or part of the algorithms and steps described here can be implemented in software form by execution of a set of instructions by a programmable machine, such as a DSP ("Digital Signal Processor") or a microcontroller or a processor. All or part of the algorithms and steps described here can also be implemented in hardware form by a machine or a dedicated component, such as an FPGA ("Field-Programmable Gate Array") or an ASIC ("Application-Specific Integrated Circuit"). Thus, the information processing system comprises electronic circuitry adapted and configured to implement the algorithms and steps described here.

Figure 5:
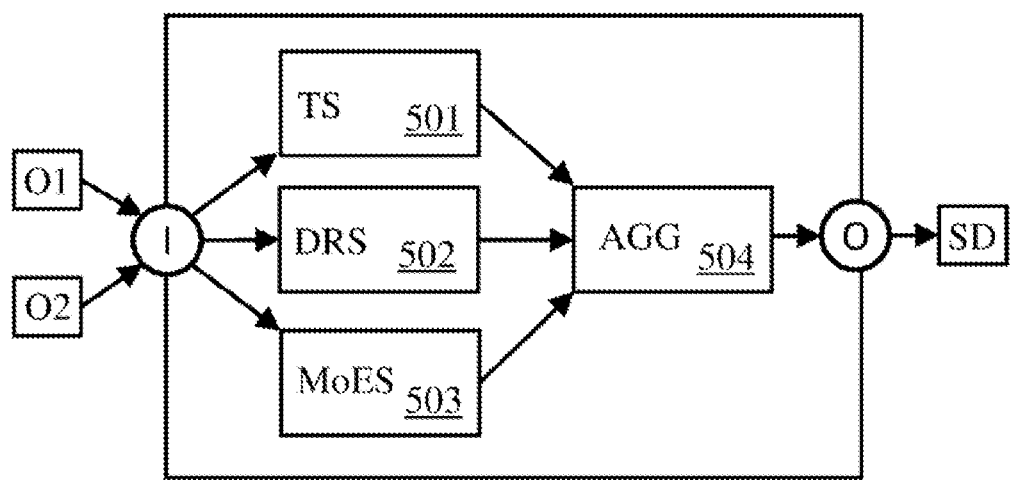
FIG. 5 schematically illustrates a mechanism for calculating similarity distance between two instances of individuals, in a particular embodiment.

FIG. 5 schematically illustrates a mechanism for calculating similarity distance between two instances of individuals, in a particular embodiment in which a similarity distance calculation based on the evolution models is aggregated with at least one other similarity distance calculation. In the similarity distance calculations, the instances of individuals are compared pairwise, e.g. instances of individuals O1 and O2 are injected as input (I) for the similarly distance calculation.

A first similarity distance is calculated using a taxonomic similarity TS 501 distance calculation module. The instances of individuals O1 and O2 are instances of class in the ontology considered. The taxonomic similarity distance calculation compares the positions of the classes of the instances of individuals O1 and O2. In the ontology considered, the classes and properties are organized hierarchically and this hierarchy can be represented by a graph. For example, a "submarine" class (node) and a "boat" class (node) both inherit from an "embarkation" class (node) which itself inherits from a "vehicle" class (node), and "aircraft" and "land vehicle" classes (node) also inherit from the "vehicle" class (node), and so on. A distance between two graph nodes can be calculated by counting the number of edges of the shortest path between the nodes considered in the graph. The taxonomic similarity measurement also takes account of another criterion to represent the depth in the ontological hierarchy. This depth criterion is often represented by the smallest sub-denominator (the most specific one) of the two instances of individuals O1 and O2. For this, the Wu and Palmer similarity distance calculation method can be used to address these criteria. The taxonomic similarity distance TS(O1; O2) is, here, defined based on the distance which separates the two classes C1 and C2 of the instances of individuals O1 and O2 with respect to the root R of the hierarchy and according to the distance which separates their smallest common sub-denominator C0 with respect to the root R of the hierarchy, according to the following formula:

$$TS(O1; O2) = \frac{2.d(R; C0)}{d(R; C0; C1) + d(R; C0; C2)}$$

in which d(R; C0) is the distance which separates the class C0 from the root R of the hierarchy, d(R; C0; C1) is the distance which separates the class C1 from the root R in passing through the class C0 and d(R; C0; C2) is the distance which separates the class C2 from the root R in passing through the class C0. Reference will be able to be made to the document "*Verb Semantics and Lexical Selection*", Z. Wu and M. Palmer, Proceedings of the 32nd Annual Meetings of the Associations for Computational Linguistics, 1994.

The same principle applies for determining the distance between properties in the hierarchy defined by the ontology considered.

A second similarity distance is calculated using a domain and range similarity DRS distance calculation module 502. The domain and range similarity DRS distance calculation compares the number of fields (properties) shared by the two classes C1 and C2 to which the two instances of individuals O1 and O2 respectively belong, normalized by their total number of fields. The ontology is in fact preferentially not limited to the hierarchical structure of concepts in the form of classes, but also includes definitions of domain and range within the properties, as shown by the following system of equations. Thus, the calculation of similarity distance between two classes involves the comparison of properties which appear in common in the considered instances of these classes.

$$OPDS(O1; O2) = \frac{2.|OPD(C1) \cap OPD(C2)|}{|OPD(C1)| + |OPD(C2)|}$$

$$OPRS(O1; O2) = \frac{2.|OPR(C1) \cap OPR(C2)|}{|OPR(C1)| + |OPR(C2)|}$$

$$DPDS(O1; O2) = \frac{2.|DPD(C1) \cap DPD(C2)|}{|DPD(C1)| + |DPD(C2)|}$$

in which OPD(C) (C=C1 or C2) represents the set of the properties of relationship type which have the class C in the definition of domain of a first subject, and |OPD(C)| represents the cardinality of this set; OPR(C) represents the set of properties of relationship type which have the class C in the definition of range of a second subject, and |OPR(C)| represents the cardinality of this set; DPD(C) represents the set of properties of literal type which have the class C in their definition of range, and |DPD(C)| is the cardinality of this set.

The domain and range similarity DRS distance calculation is then obtained as follows:

$$DRS(O1;O2)=(((OPDS(O1;O2)+OPRS(O1;O2))/2)+DPDS(O1;O2))/2$$

The taxonomic similarity TS distance calculation and the domain and range similarity DRS distance calculation are notably addressed in the document "*Semantic Decision Support for Information Fusion Applications*", A Bellenger, PhD Thesis, Institut National des Sciences Appliquées de Rouen [*Rouen National Institute of Applied Sciences*], 2013, more particularly in the section 7.2.1.1 "*Semantic Similarity regarding the Terminology of the Ontology*".

A third similarity distance is calculated using a similarity distance calculation module based on the MoES ("Model of Evolution-based Similarity") evolution models 503. As already indicated, the similarity distance based on the MoES evolution models between the instances of individuals O1 and O2 is an averaged sum of the weighted similarity distances of each property p common to the two instances of individuals O1 and O2, as follows:

$$MoES(O1, O2) = \frac{\sum (dist(p_{O1}, p_{O2}) \cdot \gamma_p)}{\sum (\gamma_p)}$$

The first, second and third similarity distances are then combined by an aggregator module AGG 504, in order to produce, at the output (O) of the similarity distance calculation, a similarity distance SD between instances of individuals O1 and O2. Preferentially, the aggregator module AGG 504 applies respective weights to the first, second and third similarly distances, in order to give more or less importance to each of them and normalize the result. The weights respectively attributed to the first, second and third similarity distances are defined as a function of the application framework considered. The ontology can thus for example give a greater weight to the taxonomic similarity distance TS than to the similarity distance based on the MoES evolution models and the domain and range similarity distance DRS.

The mechanism for calculation of similarity distance between two instances of individuals has been presented in FIG. 5 in modular form. The modules concerned can be hardware modules or software modules. Furthermore, the similarity distance calculation mechanism presented in FIG. 5 is also representative of a method including steps of calculation of the first, second and third similarity distances, and of the corresponding aggregation, as described above.

The invention claimed is:

1. A method for processing information originating from varied sources and used to generate instances of individuals by ontology matching, the information processing method comprising information fusion aimed at merging the instances of individuals which correspond to a single individual, the method being implemented by a data processing system, wherein the method comprises:
generating the instances of individuals using an ontology which defines, for each property of each instance of an individual, an evolution model to be applied to said property, the evolution model represents evolution of reliability of said property over time in relation to variability of said property over time;
performing the information fusion by comparing, pairwise, instances of individuals generated, on one hand, with instances of individuals stored in a knowledge base, on other hand, by performing, for each property in common, a calculation of similarity distance by applying at least the evolution model defined for said property, to define a coefficient of confidence of each property to decide to merge or not merge said instances of individuals; and
updating the knowledge base with the instances of individuals resulting from the information fusion, wherein each evolution model is of one type from among the following possible three types:
constant, for the properties which do not change over time;
predictive, for the properties which can be estimated over a limited certain time period or with a certain uncertainty which evolves over time; and
circumstantial, for the properties whose evolution over time depends on the occurrence of an event,
wherein each instance of individual which results from the fusion of two other instances of individual retains only one value for each property out of those available in said other instances of individual and the retained value depends on the evolution model with which said property is associated.

2. The method as claimed in claim 1, wherein the circumstantial evolution model is an exponential decay model.

3. The method as claimed in claim 1, wherein:
in the case of the constant evolution models, the value retained is that which has the best accuracy;
in the case of the predictive evolution models, the value retained is the most recent; and
in the case of the circumstantial evolution models, the value retained is that which shows the highest coefficient of confidence according to the following system of equations:

$$\gamma_1 = \lambda_1 \cdot e^{-(t1-t2)/\tau}$$

$$\gamma_2 = \lambda_2$$

in which the index "1" represents the oldest information and the index "2" represents the most recent information, in which $\lambda$ is the coefficient representative of a reliability of the source that performed the capture of the information considered, $\tau$ is a time factor emphasizing exponential decay, and t represents the instant of capture of the information considered.

4. The method as claimed in claim 1, further comprising:
analyzing the results obtained by the information fusion in a situation awareness system, and detecting abnormal behaviors of individuals through a set of predefined rules, or through a situation ontology model, and through the instances of individuals resulting from the information fusion.

5. The method as claimed in claim 1, wherein the calculation of similarity distance by applying at least of the evolution model is aggregated with at least one other calculation of similarity distance.

6. The method as claimed in claim 5, wherein the calculations of similarity distance are weighted.

7. The method as claimed in claim 5, wherein one said other calculation of similarity distance is a calculation of taxonomic similarity distance and one said other calculation of similarity distance is a calculation of range domain similarity distance.

8. The method as claimed in claim 1, wherein the calculation of similarity distance by applying at least of the evolution model applies a coefficient of reliability of the sources having captured the information considered.

9. The method as claimed in claim 1, wherein the information to be processed is soft information and/or hard information.

10. A non-transitory information storage medium storing a computer program comprising instructions for implementing, by a processor, the method as claimed in claim 1, when said program is read and run by said processor.

11. A system for processing information originating from varied sources and used to generate instances of individuals by ontology matching, the information processing system comprising electronic circuitry implementing an information fusion aimed at merging the instances of individuals which correspond to a single individual, wherein the electronic circuitry implements:
generating the instances of individuals by using an ontology which defines, for each property of each instance of an individual, an evolution model to be applied to said property, the evolution model represents evolution of reliability of said property over time in relation to variability of said property over time;
performing the information fusion by comparing, pairwise, instances of individuals generated, on one hand, with instances of individuals stored in a knowledge base, on other hand, by performing, for each property in common, a calculation of similarity distance by the applying at least the evolution model defined for said property, to define a coefficient of confidence of each property to decide to merge or not merge said instances of individuals; and
updating the knowledge base with the instances of individuals resulting from the information fusion wherein each evolution model is of one type from among the following possible three types:
constant, for the properties which do not change over time;
predictive, for the properties which can be estimated over a limited certain time period or with a certain uncertainty which evolves over time; and circumstantial, for the properties whose evolution over time depends on the occurrence of an event, wherein each instance of individual which results from the fusion of two other instances of individual retains only one value for each property out of those available in said other instances of individual and the retained value depends on the evolution model with which said property is associated.

\* \* \* \* \*